United States Patent
Rutter et al.

(10) Patent No.: US 11,603,854 B2
(45) Date of Patent: Mar. 14, 2023

(54) ELECTRICAL SUBMERSIBLE PUMP SEAL SECTION REDUCED LEAKAGE FEATURES

(71) Applicant: Baker Hughes Oilfield Operations LLC, Houston, TX (US)

(72) Inventors: Risa Rutter, Claremore, OK (US); Steven Alan Howell, Oklahoma City, OK (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 141 days.

(21) Appl. No.: 16/941,332

(22) Filed: Jul. 28, 2020

(65) Prior Publication Data

US 2021/0033089 A1 Feb. 4, 2021

Related U.S. Application Data

(60) Provisional application No. 62/880,814, filed on Jul. 31, 2019.

(51) Int. Cl.
*F04D 29/08* (2006.01)
*F04B 53/18* (2006.01)
(Continued)

(52) U.S. Cl.
CPC .......... *F04D 29/086* (2013.01); *E21B 43/128* (2013.01); *F04B 53/18* (2013.01); *F04D 13/086* (2013.01)

(58) Field of Classification Search
CPC .......... F04B 53/18; F04B 47/02; F04B 15/02; F04B 17/03; F04D 29/086; F04D 29/126;
(Continued)

(56) References Cited

U.S. PATENT DOCUMENTS 3,438,640 A * 4/1969 Wilkinson ............... F16J 15/36
277/391
4,103,904 A * 8/1978 Tankus .................. F16J 15/366
277/916
(Continued)

FOREIGN PATENT DOCUMENTS

CN 107191596 A 9/2017

OTHER PUBLICATIONS

International Search Report and Written Opinion of PCT Application No. PCT/US2020/044316 dated Nov. 11, 2020: pp. 1-8.

*Primary Examiner* — Alexander B Comley
(74) *Attorney, Agent, or Firm* — Bracewell LLP; Keith R. Derrington

(57) ABSTRACT

A submersible pump assembly includes a pump, a motor, and a seal section connected between. A shaft passage in the seal section has an outboard end that is open to the pump intake and an inboard end that is in fluid communication with motor lubricant in the motor. A drive shaft extends axially within the shaft passage. An outboard bearing at the outboard end of the shaft passage receives the shaft to provide radial support. An inboard bearing at the inboard end of the shaft passage receives the shaft to provide radial support. A shaft seal in the shaft passage receives and seals around the shaft. The shaft seal is located between the outboard bearing and the inboard bearing and seals motor lubricant in the shaft passage from well fluid in the shaft passage.

19 Claims, 2 Drawing Sheets

(51) Int. Cl.
*E21B 43/12* (2006.01)
*F04D 13/08* (2006.01)

(58) Field of Classification Search
CPC ...... F04D 29/046; F04D 29/10; F04D 13/086; F04D 29/106; F04D 13/08–10; E21B 43/128; E21B 43/35; F16C 33/723
See application file for complete search history.

(56) References Cited

U.S. PATENT DOCUMENTS

| | | | |
|---|---|---|---|
| 4,906,008 A * | 3/1990 | Warner | F16J 15/348 |
| | | | 277/390 |
| 5,116,066 A | 5/1992 | Crawford | |
| 6,200,086 B1 | 3/2001 | Oshea | |
| 6,225,720 B1 | 4/2001 | Desta | |
| 7,004,473 B2 | 2/2006 | Takahashi | |
| 7,048,046 B1 | 5/2006 | Sakamoto | |
| 7,334,356 B2 | 2/2008 | Ellis, III | |
| 7,665,975 B2 | 2/2010 | Parmeter et al. | |
| 8,246,328 B1 | 8/2012 | Howell et al. | |
| 8,714,556 B2 | 5/2014 | Pinto et al. | |
| 9,777,560 B2 | 10/2017 | Tetzlaff et al. | |
| 10,082,150 B2 | 9/2018 | Rutter et al. | |
| 2003/0122313 A1 * | 7/2003 | Takahashi | F16J 15/3484 |
| | | | 277/358 |
| 2007/0140876 A1 | 6/2007 | Parmeter et al. | |
| 2010/0148448 A1 * | 6/2010 | Pinto | F16J 15/348 |
| | | | 277/371 |
| 2015/0337843 A1 | 11/2015 | Tanner et al. | |
| 2016/0145984 A1 | 5/2016 | Tetzlaff et al. | |
| 2017/0037861 A1 * | 2/2017 | Rutter | F04D 29/102 |
| 2017/0051829 A1 * | 2/2017 | Collins | E21B 43/128 |
| 2017/0260990 A1 * | 9/2017 | Pyron | F04D 29/061 |
| 2020/0096992 A1 | 3/2020 | Cella et al. | |

* cited by examiner

ELECTRICAL SUBMERSIBLE PUMP SEAL SECTION REDUCED LEAKAGE FEATURES

CROSS REFERENCE TO RELATED APPLICATION

This application claims priority to provisional application 62/880,814, filed Jul. 31, 2019.

FIELD OF THE DISCLOSURE

This disclosure relates in general to electrical submersible well pumps (ESP), particularly to a seal section having the pump intake in the upper end of the seal section, the seal section having an upper bearing immersed in well fluid. The seal section has a mechanical face seal below the upper bearing and above a lower bearing, the mechanical face seal having a non-rotating base urged against a rotating runner.

BACKGROUND

Electrical submersible well pumps are often used to pump liquids from hydrocarbon producing wells. A typical ESP includes a pump driven by an electrical motor. The motor is filled with a dielectric lubricant for lubricating motor bearings. A pressure equalizer reduces a differential between the hydrostatic well fluid pressure and the lubricant pressure. The pressure equalizer may be located in a seal section between the motor and the pump. The pump intake is normally at the lower end of the pump.

The shaft in the seal section is radially supported at its ends by radial bearings that are immersed in lubricant in communication with the motor lubricant in the seal section. Normally, the seal section has a mechanical face seal located above the uppermost radial bearing for sealing well fluid from entry into the seal section. The mechanical face seal has a rotating runner that is urged by a spring and diaphragm against a non-rotating base.

The shaft in the seal section tends to vibrate, particularly at high rotational speeds. Vibration can cause fatigue of components in the seal section. Also, the vibration can cause leakage of well fluid past the mechanical face seal into the seal section. The well fluid can migrate through the motor lubricant in the seal section, eventually reaching the motor. Contamination of the motor lubricant in the motor by well fluid can quickly cause failure of the motor.

SUMMARY

A submersible pump assembly comprises a pump, a well fluid intake for flowing well fluid into the pump, a motor containing a motor lubricant, and a seal section connected between the motor and the well fluid intake. A shaft passage in the seal section has a longitudinal axis, an outboard end that is open to the well fluid intake and an inboard end that is in fluid communication with motor lubricant in the motor. A drive shaft extends axially within the shaft passage, the drive shaft being driven by the motor for driving the pump. An outboard bearing at the outboard end of the shaft passage receives the shaft to provide radial support. The outboard bearing is in non-sealing engagement with the shaft passage to enable well fluid to flow from the well fluid intake through the outboard bearing into the shaft passage. An inboard bearing at the inboard end of the shaft passage receives the shaft to provide radial support. The inboard bearing is in non-sealing engagement with the shaft passage to enable motor lubricant to flow through the inboard bearing into the shaft passage. A shaft seal in the shaft passage receives and seals around the shaft. The shaft seal is located axially between the outboard bearing and the inboard bearing. The shaft seal seals motor lubricant in the shaft passage from well fluid in the shaft passage.

A vent port may join the shaft passage axially between the outboard bearing and the shaft seal. The vent port extends from the shaft passage to an exterior of the seal section for venting debris that migrates through the outboard bearing into the shaft passage.

In the embodiment shown, the shaft seal comprises a rotating face member rigidly mounted to the shaft for rotation in unison. The rotating face member has a rotating face that rotates in unison with the rotating face member. A non-rotating face member with a non-rotating face is mounted for non-rotation in the shaft passage. A spring urges the rotating face and the non-rotating face against each other. The rotating and non-rotating faces may be wear resistant carbide rings.

In the embodiment shown, an annular wedge member between the rotating face member and the shaft rigidly secures the rotating face member to the shaft. A collar overlies and extends outward from the wedge member. The collar has a depending annular sidewall in threaded engagement with the rotating face member.

In one embodiment, a counterbore in the shaft passage has a shoulder facing the shaft seal. An annular debris blocking member secures to the shoulder. The debris blocking member has an inner diameter through which the shaft extends. The inner diameter of the debris blocker is smaller than an inner diameter of the shaft passage to retard debris from depositing on the shaft seal.

In the embodiment shown, the non-rotating face member has an annular cavity. A carbide ring is carried within the cavity for axial movement and non-rotation relative to the non-rotating face member. An elastomeric seal ring encircles and seals between the carbide ring and a wall of the cavity. A plurality of springs are spaced around the cavity. Each of the springs has one end in contact with a bottom of the cavity and another end in contact with the carbide ring, urging the carbide ring into sliding and sealing engagement with the rotating face member. A non-rotating face member seal ring encircles the non-rotating face member and seals against a sidewall of the counterbore.

In the embodiment shown, the seal section comprises a housing, a guide member, and an intake member. The guide member is secured by threads to the housing. The intake member is secured by threads to the guide member. The well fluid intake is located in the intake member.

The shaft passage is located in the intake member and the guide member.

DETAILED DESCRIPTION OF THE DISCLOSURE

Figure 1:
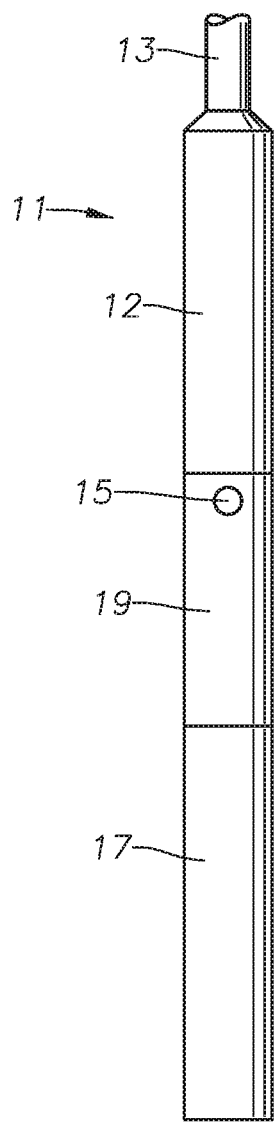
FIG. 1 is a schematic side view of an electrical submersible pump in accordance with this disclosure and installed in a well.

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude. The terms "upper" and "lower" and the like bare used only for convenience as the well pump may operate in positions other than vertical, including in horizontal sections of a well.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, electrical well pump assembly (ESP) 11 is of a type typically used for oil well pumping operations. ESP 11 includes a rotary pump 12 that may be a centrifugal pump having a large number of stages, each of the stages having an impeller and a diffuser. Pump 12 may be suspended in a well on a string of production tubing 13. Pump 12 has an intake 15 for well fluid.

ESP 11 also includes an electrical motor 17 for driving pump 12. Motor 17 connects to pump 12 via a seal section 19. In this embodiment, intake 15 is located in the upper end of seal section 19. A gas separator may be employed below pump 12. If so, intake 15 would be below the gas separator, and for the purposes herein, the gas separator is considered to be part of pump 12. Pump 12 discharges into production tubing 13 in this example.

Figure 2:
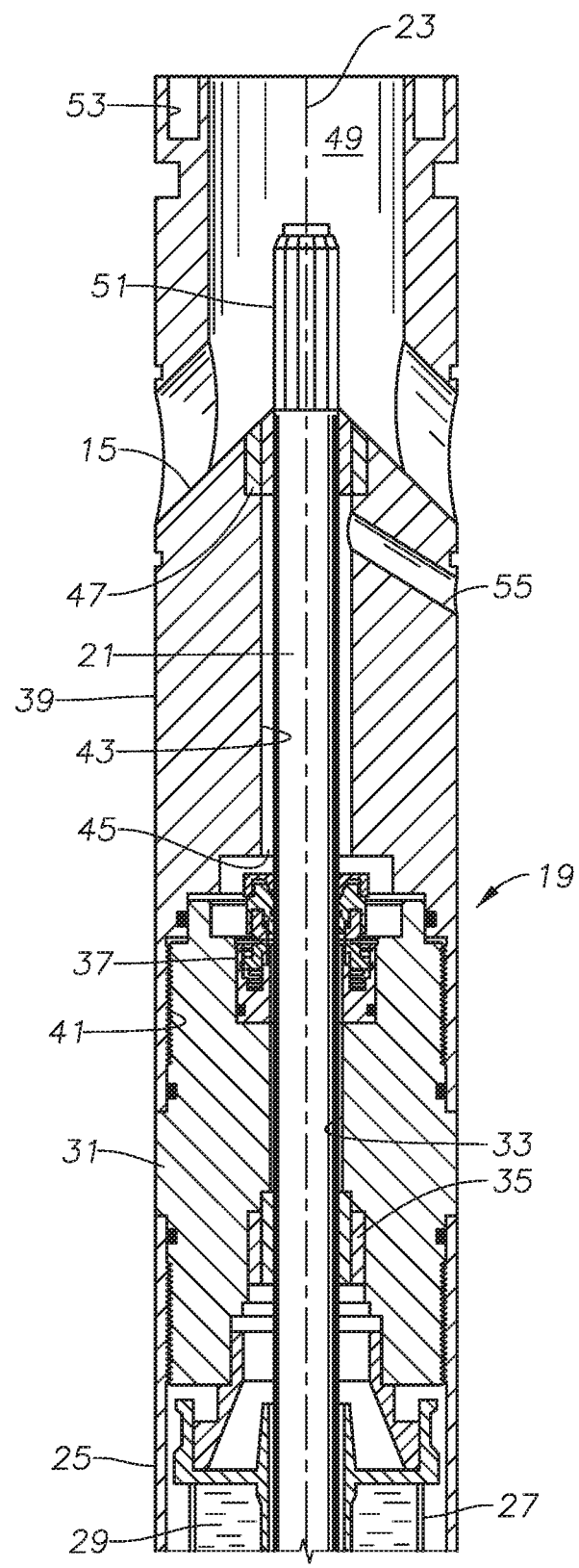
FIG. 2 is an axial sectional view of portions of the seal section of the electrical submersible pump of FIG. 1.

Referring to FIG. 2, seal section 19 has a drive shaft 21 extending along a longitudinal axis 23 of a cylindrical housing 25. Shaft 21 has a lower splined end (not shown) coupled to a shaft of motor 17 for rotating shaft 21. Seal section 19 has one or more pressure equalizers 27 (only one partly shown) that in this example comprise flexible bags or containers. The interior of equalizer 27 is filled with and in communication with motor lubricant 29 from motor 17 (FIG. 1). Seal section 19 has a well fluid inlet port (not shown) that admits well fluid into housing 25 on the exterior of equalizer 27. In this example, motor lubricant 29 has a greater weight or density than the well fluid, which is normally mostly water.

Housing 25 also includes an upper guide or connector 31 that secures by threads to the upper end of the cylindrical wall of housing 25. A similar connector or guide (not shown) is at the lower end of seal section 19 for connecting to motor 17. Upper guide 31 has a shaft passage 33 extending along axis 23. An inboard or lower bearing 35 is located at the lower end of upper guide shaft passage 33. Inboard bearing 35 comprises a sleeve that rotates with shaft 21 in sliding engagement with a non-rotating bushing at the lower end of upper guide shaft passage 33. Motor lubricant 29 from the interior of equalizer 27 is in communication with an annular clearance in upper guide shaft passage 33 around shaft 21. Inboard bearing 35 is immersed in motor lubricant 29 and does not seal or prevent motor lubricant from flowing upward in upper guide shaft passage 33. A mechanical face seal 37 locates at the upper end of upper guide shaft passage 33 and seals the upper end of upper guide shaft passage 33 around shaft 21.

Seal section housing 25 also includes an intake member 39 that connects to the upper end of upper guide 31. In this example, intake member 39 has internal threads 41 on its lower end that engage external threads on upper guide 31. Intake member 39 has an intake member shaft passage 43 that extends through it on axis 23. Shaft 21 extends through intake member shaft passage 43 and has a smaller outer diameter than intake member shaft passage 43, defining an intake member shaft annulus 45. Intake member shaft passage 43 may have a larger diameter than guide member shaft passage 33, as illustrated.

An upper or outboard bearing 47 provides radial support to shaft 21 at the upper end of intake member shaft passage 43. Like inboard bearing 35, outboard bearing 47 comprises a sleeve keyed to shaft 21 for rotation and a non-rotating bushing that may be press-fit in the upper end of intake member shaft passage 43. Well fluid lubricates outboard bearing 47 rather than motor lubricant 29, which lubricates inboard bearing 35. Outboard bearing 47 does not seal, thus well fluid will pass downward through outboard bearing 47 into intake member annulus 45

Intake member 39 has a bore or well fluid passage 49 extending upward from lower bearing 47. Well fluid passage 49 has a diameter much larger than intake member shaft passage 43. Well fluid ports 15 extend from the exterior of intake member 39 to well fluid passage 49. Shaft 21 extends into well fluid passage 49 and has a splined end 51 located above outboard bearing 47. Splined end 51 couples to the lower end of a shaft (not shown) in pump 12. Intake ports 15 are spaced around splined end 51. Intake member 39 has threaded bolt holes 53 spaced around its upper end for connection to a lower end connector of pump 12.

One or more vent ports 55 may be employed to discharge some of the well fluid debris that passes through outboard bearing 47 and enters intake member annulus 45. Vent port 55 leads from intake member annulus 45 to the exterior of intake member 39 and is inclined downward. In this example, the inclination is about 30 degrees, less than the inclination of well fluid inlet ports 15.

Figure 3:
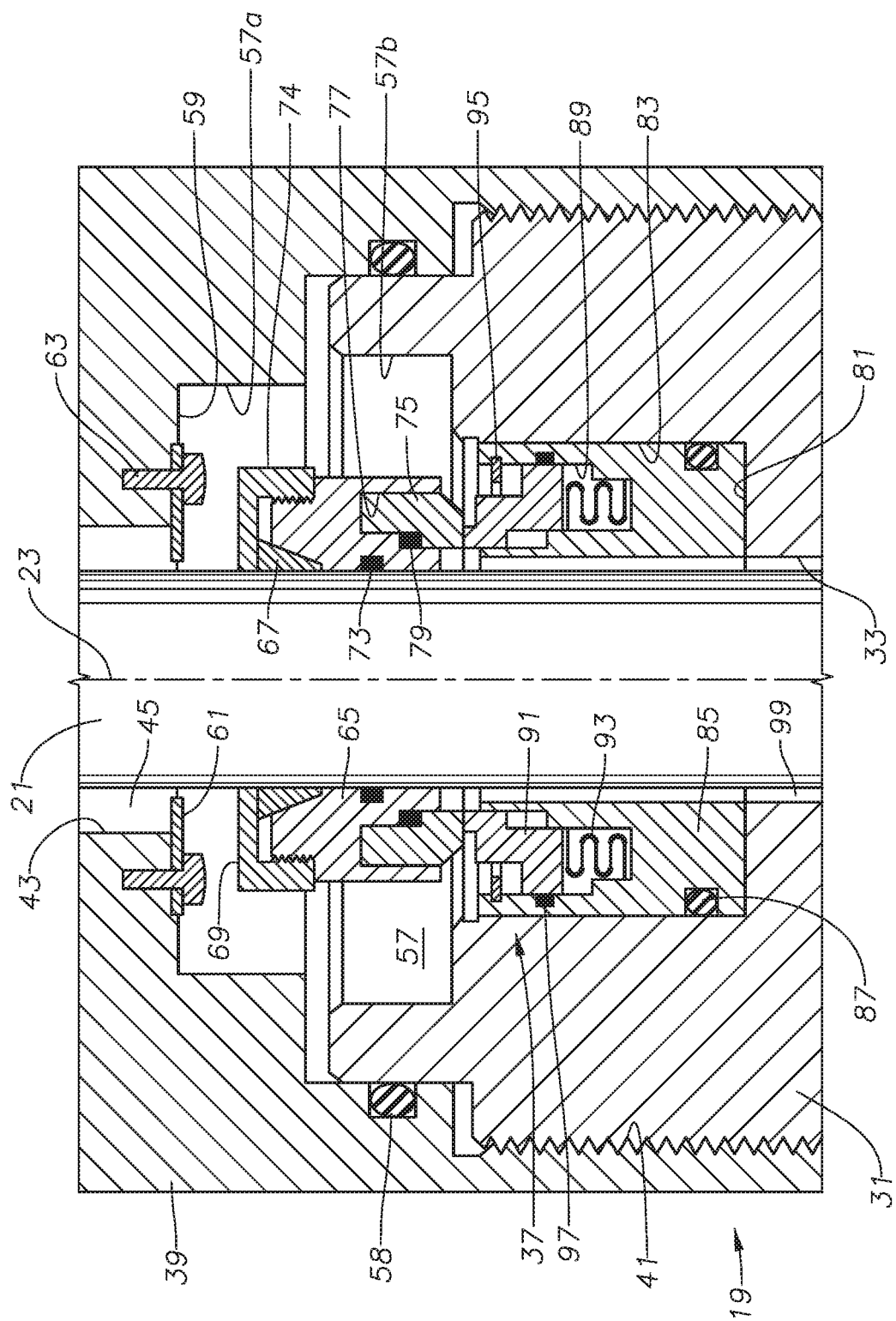
FIG. 3 is an enlarged sectional view of the mechanical face seal of the seal section of FIG. 2.

Referring to FIG. 3, in this embodiment, intake member shaft passage 43 has a downward-facing counterbore 57a at its lower end that has a larger inner diameter than the outer diameter of mechanical face seal 37. Upper guide 31 has an upward-facing counterbore 57b on its upper end that registers with downward-facing counterbore 57a. Counterbores 57a and 57b define a chamber 57 in communication with intake member annulus 45 and containing mechanical face seal 37. A seal ring 58 between an outward-facing wall of counterbore 57b and an inward-facing wall of counterbore 57a seals chamber 57.

Downward-facing counterbore 57a has a downward-facing shoulder 59. A debris blocker 61 secures to downward-facing shoulder 59 with a plurality of fasteners 63. Debris blocker 61 is an annular member with an inner diameter smaller than the inner diameter of intake member shaft passage 43 to retard the entry of debris, such as sand in the well fluid, from depositing in chamber 57 on top of mechanical face seal 37. Debris blocker 61 does not prevent liquid from passing, and may be an elastomeric member such as a lip seal that is in sliding but non sealing engagement with shaft 21. Alternately, debris blocker 61 could be a rigid plate with an inner diameter slightly larger than the outer diameter of shaft 21.

Mechanical face seal 37 includes a rotating face member 65 secured to shaft 21 for rotation in unison. In this embodiment, a wedge ring 67 rigidly secures rotating face member 65 to shaft 21, preventing any rotational and axial movement of rotating face member 65 relative to shaft 21. Wedge ring 67 has a tapered surface that engages a tapered surface in the inner diameter of rotating face member 65.

A cap or collar 69 abuts the top of wedge ring 67 and centralizes rotating face member 65. Collar 69 has a depending sidewall 74 with internal threads that engage external threads on rotating face member 65. Tightening collar 69 to rotating face member 65 forces wedge ring 67 tightly into the tapered surface of rotating face member 65. An elastomeric seal ring 73 seals between the inner diameter of rotating face member 65 and shaft 21.

In this embodiment, a hard, wear-resistant ring, referred to herein as upper carbide ring 75, rigidly mounts in a cavity 77 on the lower side of rotating face member 65, such as by an interference fit. Upper carbide ring 75 may be considered to be a part of rotating face member 65 and has a flat face on its lower end. A seal ring 79 seals between an inward-facing sidewall of upper carbide ring 75 and an outward-facing wall of cavity 77.

Upper guide shaft passage 33 has a counterbore 81 at its upper end that joins counterbore 57b and has a smaller diameter in this example. Counterbore 81 has an inward-facing sidewall 83. Mechanical face seal 37 has a non-rotating face member or base 85 that fits in counterbore 81 for non-rotation relative to upper guide 31. For example, non-rotating face member 85 and counterbore 81 may have a tab and slot arrangement (not shown) to prevent rotation. A seal ring 87 located in an annular groove on the outer diameter of non-rotating face member 85 seals against inward-facing sidewall of 83 of counterbore 81.

Non-rotating face member 85 has an upward facing cavity 89 above seal ring 87. Upward facing cavity 89 contains a lower or non-rotating carbide ring 91, which is also a hard, wear resistant member and may be considered to be a part of non-rotating face member 85. Lower carbide ring 91 is prevented from rotation relative to non-rotating face member 85, such as by a tab engaging an axial groove or slot (not shown) between the inner diameter of lower carbide ring 91 and an outward-facing wall of cavity 89.

A spring arrangement biases lower carbide ring 91 upward in cavity 89, causing a flat face on its upper end to be engaged by the face on upper carbide ring 75 in sliding, sealing engagement. In this example, the spring arrangement includes multiple coil springs 93 (only two shown) equally spaced around cavity 89. A retaining ring 95 near the upper end of cavity 89 limits the upward movement of lower carbide ring 91 during assembly prior to the connection of rotating face member 65 on shaft 21. A seal ring 97 on the outer diameter of lower carbide ring 91 slides on and sealingly engages the inward facing sidewall of cavity 89.

An annular clearance 99 exists between the inner diameter of non-rotating face member 85 and shaft 21 and also between upper guide shaft passage 33 and shaft 21. Annular clearance 99 allows motor lubricant 29 (FIG. 2) to communicate with the inward-facing sidewall of lower carbide ring 91 and also the inward-facing side wall of upper carbide ring 75. The outward-facing sidewalls of upper carbide ring 75 and lower carbide ring 91 are in contact with well fluid that has passed through outboard bearing 47, filling intake member annulus 45 and chamber 57. The mating faces of upper and lower carbide rings 75, 91 retard leakage of well fluid into annular clearance 99. The sliding engagement tends to allow slight leakage, but the heavier weight of motor lubricant 29 further retards migration of the well fluid contamination in annular clearance 99 from reaching equalizer 27 (FIG. 2).

The present invention described herein, therefore, is well adapted to carry out the objects and attain the ends and advantages mentioned, as well as others inherent therein. The outboard bearing provides additional radial support to the shaft to reduce vibration.

While only one embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

The invention claimed is:

1. A submersible pump assembly, comprising:
   a pump;
   a motor containing a motor lubricant;
   a seal section connected between the motor and the pump, the seal section comprising,
      an equalizer,
      an intake member between the equalizer and the pump and having a well fluid intake for flowing well fluid into the pump, and
      a guide member between the equalizer and the intake member;
   a shaft passage extending within the intake member and the guide member, the shaft passage having a longitudinal axis, an outboard end that is open to the well fluid intake, and an inboard end that is in fluid communication with motor lubricant in the motor;
   a drive shaft extending axially within the shaft passage, the drive shaft being driven by the motor for driving the pump;
   an outboard bearing in the intake member and at the outboard end of the shaft passage that receives the shaft to provide radial support, the outboard bearing being in non-sealing engagement with the shaft passage to enable well fluid to flow from the well fluid intake through the outboard bearing into the shaft passage;
   an inboard bearing in the guide member and at the inboard end of the shaft passage that receives the shaft to provide radial support, the inboard bearing being in non-sealing engagement with the shaft passage to enable motor lubricant to flow through the inboard bearing into the shaft passage; and
   a shaft seal in the shaft passage that receives and seals around the shaft, the shaft seal being located axially between the outboard bearing and the inboard bearing, the shaft seal sealing motor lubricant in the shaft passage from well fluid in the shaft passage.

2. The assembly according to claim 1, further comprising:
   a vent port joining the shaft passage axially between the outboard bearing and the shaft seal and extending from the shaft passage to an exterior of the seal section for venting debris that migrates through the outboard bearing into the shaft passage.

3. The assembly according to claim 1, wherein the shaft seal comprises:
   a rotating face member rigidly mounted to the shaft for rotation in unison, the rotating face member having a rotating face that rotates in unison with the rotating face member;

a non-rotating face member mounted for non-rotation in the shaft passage, the non-rotating face member having a non-rotating face; and
a spring that urges the rotating face and the non-rotating face against each other.

4. The assembly according to claim 1, wherein the shaft seal comprises:
a rotating face member rigidly mounted to the shaft;
a rotating carbide ring carried by the rotating face member that rotates in unison with the shaft;
a non-rotating face member rigidly mounted in the shaft passage;
a non-rotating carbide ring carried by the non-rotating face member for non-rotation but axial movement relative to the non-rotating face member; and
a spring between the non-rotating carbide ring and the non-rotating face member that urges the non-rotating carbide ring upward in sliding and sealing engagement with the rotating carbide ring.

5. The assembly according to claim 1, wherein the shaft seal comprises:
a rotating face member;
an annular wedge member between the rotating face member and the shaft that rigidly secures the rotating face member to the shaft;
a collar overlying and extending outward from the wedge member, the collar having a depending annular sidewall in threaded engagement with the rotating face member;
a non-rotating face member rigidly mounted in the shaft passage;
a non-rotating wear resistant ring carried by the non-rotating face member for non-rotation relative to the non-rotating face member; and
a spring between the non-rotating face member and the non-rotating wear resistant ring that urges the non-rotating wear resistant ring into sliding and sealing engagement with the rotating face member.

6. The assembly according to claim 1, further comprising:
a counterbore having a shoulder in the shaft passage facing the shaft seal; and
an annular debris blocking member secured to the shoulder, the debris blocking member having an inner diameter through which the shaft extends, the inner diameter of the debris blocking member being smaller than an inner diameter of the shaft passage to retard debris from depositing on the shaft seal.

7. The assembly according to claim 1, wherein the shaft seal comprises:
a rotating face member rigidly mounted to the shaft;
a counterbore in the shaft passage;
a non-rotating face member rigidly mounted in the counterbore;
an annular cavity in the non-rotating face member;
a carbide ring carried within the cavity for axial movement and non-rotation relative to the non-rotating face member;
an elastomeric seal ring encircling and sealing between the carbide ring and a wall of the cavity; and
a plurality of springs spaced around the cavity, each of the springs having one end in contact with a bottom of the cavity and another end in contact with the carbide ring, urging the carbide ring into sliding and sealing engagement with the rotating face member.

8. The assembly according to claim 7, further comprising:
a non-rotating face member seal ring encircling the non-rotating face member and sealing against a sidewall of the counterbore.

9. The assembly according to claim 1, wherein:
the seal section comprises a housing that is secured to the guide member and the intake member by threads;
the well fluid intake is located in the intake member;
the shaft seal is disposed at an interface between the guide member and intake member; and
sidewalls of the guide and intake members extend from the shaft passage to an outer surface of the pump assembly.

10. A submersible pump assembly, comprising:
a well fluid pump;
a motor containing a motor lubricant;
a seal section between the motor and the pump, the seal section comprising:
a cylindrical housing wall having a longitudinal axis;
a flexible pressure equalizer surrounded by the housing wall, the pressure equalizer having an interior in fluid communication with motor lubricant in the motor and an exterior adapted to be in contact with well fluid;
a guide secured to an upper end of the housing wall above the pressure equalizer;
an intake member secured to an upper end of the guide, the intake member having an intake port for admitting well fluid, the intake member having a connector that secures an upper end of the intake member to the pump;
a shaft passage extending through the guide and having an upper end within the intake member in fluid communication with the intake port, the shaft passage having a lower end in fluid communication with motor lubricant in the motor;
a shaft extending axially though the shaft passage, the shaft being driven by the motor and having a splined upper end in the intake member for driving the well fluid pump;
an upper bearing at an upper end of the shaft passage that radially supports the shaft and is adapted to be immersed in well fluid in the intake member;
a lower bearing at a lower end of the shaft passage that radially supports the shaft and is immersed in motor lubricant in the shaft passage; and
a mechanical face seal in the shaft passage axially between the upper and lower bearings for sealing motor lubricant in a lower portion of the shaft passage from the well fluid in an upper portion of the shaft passage the mechanical face seal comprising,
a rotating face member;
an annular wedge member between the rotating face member and the shaft that rigidly secures the rotating face member to the shaft; and
a collar overlying and extending outward from the wedge member, the collar having a depending annular sidewall in threaded engagement with the rotating face member.

11. The assembly according to claim 10, further comprising:
a vent port joining the shaft passage axially between the upper bearing and the shaft seal and extending downward from the shaft passage to an exterior of the seal section for venting debris that passes through the upper bearing into the shaft passage.

12. The assembly according to claim 10, wherein the mechanical face seal further comprises:
a non-rotating face member rigidly mounted in the shaft passage;

a non-rotating carbide ring carried by the non-rotating face member for non-rotation relative to the non-rotating face member; and a spring between the non-rotating face member and the non-rotating carbide ring that urges the non-rotating carbide ring into sliding and sealing engagement with the rotating face member.

13. The assembly according to claim 10, further comprising:

a counterbore having a shoulder in the shaft passage above and facing the mechanical face seal; and an annular debris blocking member secured to the shoulder, the debris blocking member having an inner diameter through which the shaft extends, the inner diameter of the debris blocking member being smaller than an inner diameter of the shaft passage to retard debris in the shaft passage from dropping onto the mechanical face seal.

14. A submersible pump assembly, comprising:

a pump;

a motor containing a motor lubricant;

a seal section between the motor and the pump, the seal section comprising:

a housing wall having a longitudinal axis;

a flexible pressure equalizer in the housing wall, the pressure equalizer having an interior in fluid communication with motor lubricant in the motor and an exterior adapted to be in contact with well fluid;

a guide secured to an upper end of the housing wall, the guide having an axially extending guide shaft passage in fluid communication with motor lubricant in the motor;

an intake member secured to an upper end of the guide, the intake member having a well fluid passage extending downward from an upper end of the intake member to an axially extending intake member shaft passage, and the intake member having a connector that secures the upper end of the intake member to the pump;

an intake port extending laterally from the well fluid passage to an exterior portion of the intake member for admitting well fluid into the intake member shaft passage and into the pump;

a shaft extending axially though the guide shaft passage and the intake member shaft passage, the shaft being driven by the motor and having a splined upper end in the well fluid passage for driving the well fluid pump, the shaft having a smaller outer diameter than an inner diameter of the intake member shaft passage, defining an intake member annulus in the intake member shaft passage that is in fluid communication with the well fluid passage;

an upper bearing at an upper end of the intake member shaft passage that is adapted to be immersed in well fluid in the intake member passage;

a lower bearing at a lower end of the guide shaft passage, the lower bearing being immersed in motor lubricant in the guide shaft passage;

the shaft extending through and being radially supported by the upper and lower bearings;

a mechanical face seal at an upper end of the guide shaft passage for sealing motor lubricant in the guide shaft passage from well fluid in the intake member annulus;

a counterbore having a downward facing shoulder in the intake member shaft passage above the mechanical face seal; and an annular debris blocking member secured to the downward facing shoulder, the debris blocking member having an inner diameter through which the shaft extends, the inner diameter of the debris blocking member being smaller than an inner diameter of the intake member shaft passage to retard debris from depositing on the mechanical face seal.

15. The assembly according to claim 14, further comprising:

a vent port joining the intake member annulus and extending outward and downward to an exterior of the seal section for venting debris that migrates through the upper bearing into the intake member shaft passage.

16. The assembly according to claim 14, wherein the mechanical face seal comprises:

a rotating face member rigidly mounted to the shaft;

a rotating carbide ring carried by the rotating face member that rotates in unison with the shaft;

a non-rotating face member rigidly mounted in the guide shaft passage;

a non-rotating carbide ring carried by the non-rotating face member for non-rotation but axial movement relative to the non-rotating face member; and a spring between the non-rotating carbide ring and the non-rotating face member that urges the non-rotating carbide ring upward in sliding and sealing engagement with rotating carbide ring.

17. The assembly according to claim 14, wherein the mechanical face seal comprises:

a rotating face member;

an annular wedge member between the rotating face member and the shaft that rigidly secures the rotating face member to the shaft;

a collar overlying and extending outward from the wedge member, the collar having a depending annular sidewall in threaded engagement with the rotating face member;

a non-rotating face member rigidly mounted in the guide shaft passage;

a non-rotating carbide ring carried by the non-rotating face member for non-rotation relative to the non-rotating face member; and a spring between the non-rotating face member and the non-rotating carbide ring that urges the non-rotating carbide ring into sliding and sealing engagement with the rotating face member.

18. The assembly according to claim 14, wherein the mechanical face seal comprises:

a rotating face member rigidly mounted to the shaft;

a counterbore in the guide shaft passage;

a non-rotating face member rigidly mounted in the counterbore;

an annular cavity in the non-rotating face member;

a carbide ring carried within the cavity for axial movement and non-rotation relative to the non-rotating face member;

an elastomeric seal ring encircling and sealing between the carbide ring and a wall of the cavity; and a plurality of springs spaced around the cavity, each of the springs having one end in contact with a bottom of the cavity and another end in contact with the carbide ring, urging the carbide ring into sliding and sealing engagement with the rotating face member.

19. The assembly according to claim 18, further comprising:

a non-rotating face member seal ring encircling the non-rotating face member and sealing against a sidewall of the counterbore.

* * * * *